UNITED STATES PATENT OFFICE.

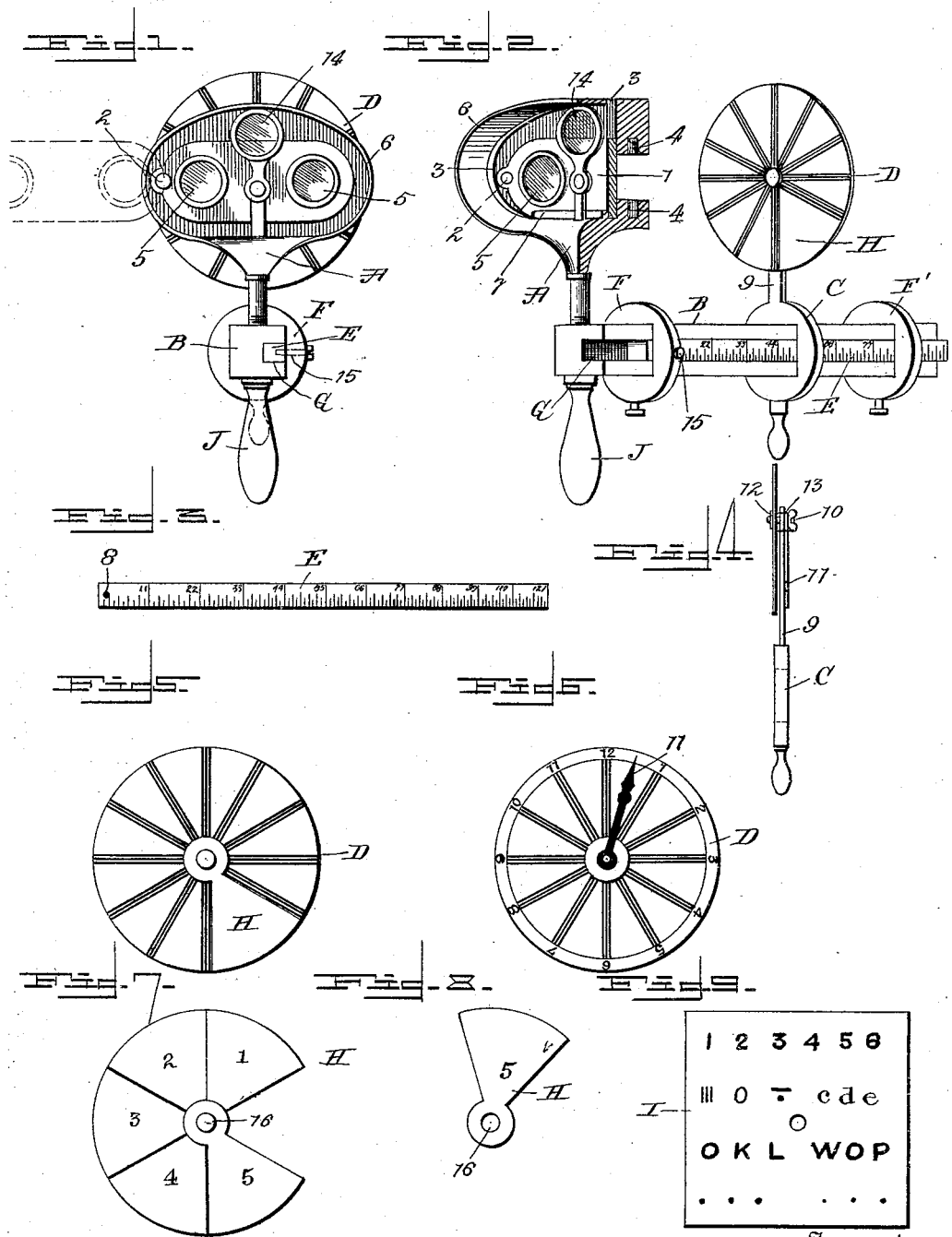

JACOB SILVER SHERMAN, OF CASSOPOLIS, MICHIGAN.

OPTOMETER.

SPECIFICATION forming part of Letters Patent No. 484,615, dated October 18, 1892.

Application filed May 28, 1892. Serial No. 434,757. (No model.)

*To all whom it may concern:*

Be it known that I, JACOB SILVER SHERMAN, a citizen of the United States of America, residing at Cassopolis, in the county of Cass and State of Michigan, have invented certain new and useful Improvements in Optometers, of which the following is a specification, reference being had therein to the accompanying drawings.

This invention relates to an instrument for determining the abnormal defects of the eyes, testing the eyesight, and for measuring the focal lengths of eyeglasses and lenses.

Reference is to be had to the accompanying drawings, forming part of the specification, in which similar letters and figures of reference indicate corresponding parts in all the figures.

Figure 1 is front view of the optometer and lens-tester. Fig. 2 is a perspective view of the instrument with the lens-holder shown in cross-section for better illustration. Fig. 3 is a view of the adjustable scale detached from the frame of the instrument. Fig. 4 is a side view of the design-holder. Fig. 5 is a front view of one form of design used with an adjustable cover in closed position for use in front thereof. Fig. 6 is a rear view of the same, showing the index-hand 11 attached to the design-holder. Figs. 7 and 8 illustrate, in an open and closed position, respectively, an adjustable cover to be placed on pin 10 of the design-holder in front of the design to conceal one or more of the representations of the lines thereon. Fig. 9 illustrates a different form of a design which may be used.

A represents a lens-holder of a general form provided with two eye-apertures 5 and a slide 1 of elongated shape, with two eye-testing lenses fixed therein in any well-known manner. This slide 1 is pivoted at one end by a pin 2 to the front face of lens-holder A, so that when the slide 1 is in position for use the lenses therein are in line with the eye-apertures in the lens-holder A, the under middle portion of slide 1 resting in a guideway 7, attached to A underneath the eye-apertures, as shown.

A hood 6 of any well-known form is attached to the front of the lens-holder A to protect the eyes of the user. The hood is fastened to the front of lens-holder A at its lower side, leaving a small space or slot 3 between its upper portion and the face of lens-holder A, in order that slide 1 may be swung upward and aside through it, as shown in Fig. 1, and thereby permit the insertion of another lens from the opposite side of the slot when it is required.

4 is a slot extending laterally through lens-holder A in rear of the front face thereof, in which may be inserted a lens when the instrument is used for measuring the focal lengths of convex and concave lenses in the usual and well-known manner by the use of one or more lenses, the eye-testing lens being swung to one side, as before described, and if a second lens is required in connection with the lens inserted in slot 4 the second lens may be inserted in slide 7. (See Figs. 1 and 2.)

B represents the frame of the instrument, made of any suitable material and preferably of a square form with a guide way or slot G, extending longitudinally on one side thereof to permit the insertion of a scale E and the adjustment of the same therein by means hereinafter described.

C is a design-holder consisting of a sliding nut embracing frame B with a set-screw to hold the same in any desired position, and a rod 9, attached to the upper part of the nut on which a slide 13 may be moved up and down. Through a side of slide 13 a screw 10 passes with a removable nut 12 upon the end thereof to permit a design to be placed on the design-holder.

11 is an index-hand placed on rod 10 in rear of rod 9.

D is a design preferably used to determine astigmatism, as well as for testing the eyesight. This design D consists of a circular card-board with radical lines drawn from near the center to the circumference thereof, of equal lengths and equal distance apart, as shown. Corresponding lines are drawn upon the back of this design and numbered, Fig. 6.

H represents an adjustable cover to conceal one or more of the representations on the design D. This cover is made of sectors of card-board, each sector having an inner circular portion 16, which portions are suitably fastened together, so that the cover may be opened or closed partly or entirely similarly to a fan.

I represents a design of ordinary form, which may be substituted for design D.

14 is a disk of sufficient size to cover one of the eye-apertures, and to that end is suitably mounted on the front face of the lens-holder between the eye-apertures in any well-known manner, so that it will not interfere with slide 1, and may be used to cover either one or the other apertures in case it is desired to test one eye or to use one aperture only.

15 is an aperture in the side of nut F for the insertion of a pin to engage a corresponding aperture in the forward end of scale E, in order that the same may be adjusted by moving nut F forward or backward, as may be desired.

Lens-holder A and handle J, of convenient form, may be cast solid with frame B or made separate, for convenience in packing, and put together by having the lower and upper extremities, respectively, screw-threaded to engage corresponding threads in apertures made in the upper and underneath sides of the forward end of frame B. Rod 9 of the design-frame may be similarly attached to nut C.

The optometer is operated as follows: For astigmatism, if the patient upon looking through the eye-testing lenses, slide 1 at design D discovers that lines on the design at a certain angle appear more distinct than the others, the index-hand in the rear of the design is set at that angle. The design is then revolved and the location of the lines which then appear the most distinct are ascertained, and so on. If each time the design is revolved the angle at which the distinct lines appear varies, it may be a case of imaginary astigmatism; but if the angle be the same or nearly the same each time the design is revolved the case may be considered as an actual case of astigmatism. Cover H is then placed on pin 10 in front of the design and opened sufficiently to cover all the distinct lines, and the limits of the focus of the dim lines ascertained by means of moving the adjustable design-holder along frame B. The cover is then adjusted to cover all the dim lines, and the limits of the focus of the distinct lines similarly ascertained. The centers are then computed in the manner described in application for patent, Serial No. 411,960, by me, to which this invention pertains, and the degree of astigmatism is obtained.

In testing convex and concave eyeglasses and lenses one or more lenses may be used in connection therewith by inserting the same in the guideways 4 and 7, heretofore described, slide 1 being removed and proceeding in any usual and well-known manner.

As the lens-tester is not made the principal matter of invention, but is merely claimed as an apparatus of well-known form, combined with the subject of invention, further description thereof is not considered necessary.

It is evident that many slight changes may be made in the arrangement of parts without departing from the spirit of the invention—e. g., instead of one frame B two frames may be used, including two scales and two test-designs, &c., and the lens-holder A may be constructed similarly to the ordinary frame of a stereoscope.

What I claim, and desire to secure by Letters Patent, is—

1. The combined optometer and lens-tester comprising a lens-holder, adjustable design, adjustable scale, a frame, and a slide with eye-testing lenses, substantially as described and set forth.

2. The combined optometer and lens-tester comprising a lens-holder, a frame, adjustable design, scale, a slide movable about a pivot, with eye-testing lenses, and a disk adjustable to cover either eye-aperture, as and for the purposes set forth.

3. In a combined optometer and lens-tester, a lens-holder, a slide with eye-testing lenses, in combination with a frame, disk to cover either eye-aperture, adjustable scale, a design, and a hood to protect the eyes, substantially as described and set forth.

4. In an optometer, the combination of a lens holder, a slide with eye-testing lenses, a frame, a design, an adjustable scale, a disk adjustable to cover either eye-aperture, substantially as described and set forth.

5. An optometer comprising a lens-holder, a slide with eye-testing lenses, a frame, an adjustable design, an adjustable scale, and a hood to protect the eyes, as and for the purposes set forth.

6. In an optometer, a lens-holder, and a slide with eye-testing lenses, in combination with a frame, an adjustable and changeable design, adjustable scale, a disk to cover either eye-aperture, and a hood to protect the eyes, substantially as described and set forth.

7. The combination of a lens-holder A, provided with an eye-protecting hood, and a disk adjustable to cover either eye-aperture, an adjustable design, a frame, and an adjustable scale, substantially as described and set forth.

In testimony whereof I affix my signature in presence of two witnesses.

JACOB SILVER SHERMAN.

Witnesses:
CASSIUS M. EBY,
W. S. PATTERSON.